United States Patent [19]

Trusch

[11] 4,316,774
[45] Feb. 23, 1982

[54] THERMOELECTRIC INTEGRATED MEMBRANE EVAPORATION SYSTEM

[75] Inventor: Raymond B. Trusch, South Windsor, Conn.

[73] Assignee: United Technologies Corporation, Hartford, Conn.

[21] Appl. No.: 54,749

[22] Filed: Jul. 5, 1979

[51] Int. Cl.³ .......................... B01D 3/10; C02F 1/04
[52] U.S. Cl. ........................................ 203/11; 203/31;
203/41; 203/86; 203/100; 203/DIG. 4;
203/DIG. 5; 62/324.2; 159/DIG. 27; 202/176;
202/177; 202/205; 210/640
[58] Field of Search ...................... 203/DIG. 5, 86, 29,
203/39, 10, 11, 41, 31, 100, DIG. 4; 202/177,
180, 176, 267, 205, 234; 62/324 B; 159/DIG.
27; 210/23 R, 321 R, 500 M, 640

[56] References Cited

U.S. PATENT DOCUMENTS

| | | | |
|---|---|---|---|
| 3,212,999 | 10/1965 | Sommers | 203/100 |
| 3,242,058 | 3/1966 | Ganley et al. | 203/10 |
| 3,261,764 | 7/1966 | Casey | 202/187 |
| 3,303,105 | 2/1967 | Konikoff et al. | 203/11 |
| 3,337,420 | 8/1967 | Zeff et al. | 203/DIG. 5 |
| 3,340,186 | 9/1967 | Weyl | 203/11 |
| 3,361,645 | 1/1968 | Blodell | 202/177 |
| 3,385,769 | 5/1968 | Brose | 202/197 |
| 3,428,535 | 2/1969 | Putnam | 204/149 |
| 3,444,051 | 5/1969 | Popma et al. | 203/DIG. 5 |
| 3,454,470 | 7/1969 | Guarino | 203/11 |
| 3,457,040 | 7/1969 | Jennings . | |
| 3,477,917 | 11/1969 | Rodgers | 203/10 |
| 3,506,543 | 4/1970 | Hayes et al. | 202/187 |
| 3,558,437 | 1/1971 | Metzger et al. | 203/DIG. 5 |
| 3,563,860 | 2/1971 | Henderyckx | 203/10 |
| 3,650,905 | 3/1972 | Rodgers | 203/10 |
| 3,671,404 | 6/1972 | Meckler | 202/187 |
| 3,886,066 | 5/1975 | Chen et al. | 210/500 M |
| 4,157,960 | 6/1979 | Chang et al. | 210/500 M |

OTHER PUBLICATIONS

Blecher, *Development of a Prototype Vapor Diffusion Water Reclamation System*, Jul. 1971, ASME.
Bambenek et al., *Extended Testing of Compression Distillation*, Aug. 1972.
Reveley et al., Design & The Parametric Testing of the Space Stat. Prototype Integr. Vap. Comp. Dist. Water Recov. Module.
Roebelen et al., Hollow Fiber Membrane for Advanced Life Support Systems.

*Primary Examiner*—Wilbur L. Bascomb, Jr.
*Attorney, Agent, or Firm*—Harry J. Gwinnell

[57] ABSTRACT

A urine-water recovery system is described which provides efficient potable water recovery from waste liquids. The design allows use over extended durations such as encountered in space flights. The system has advantages such as low power consumption, compactness, and gravity insensitive operation. The system comprises a vacuum distillation system combining a hollow fiber polysulfone membrane evaporator with a thermoelectric heat pump and condenser. With the system of the present invention, water purified from urine can be produced at a rate of more than 0.5 kg/hr at a total system energy of less than 400 w-hr/kg.

7 Claims, 10 Drawing Figures

FIG.8
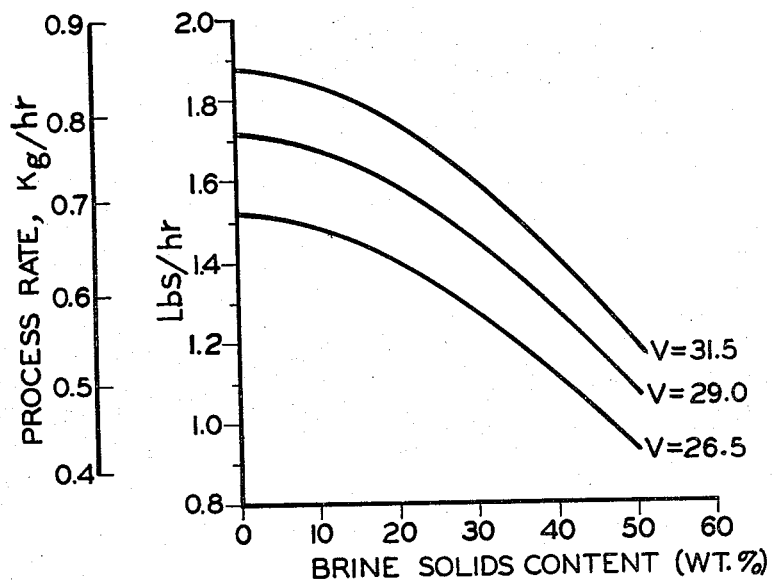
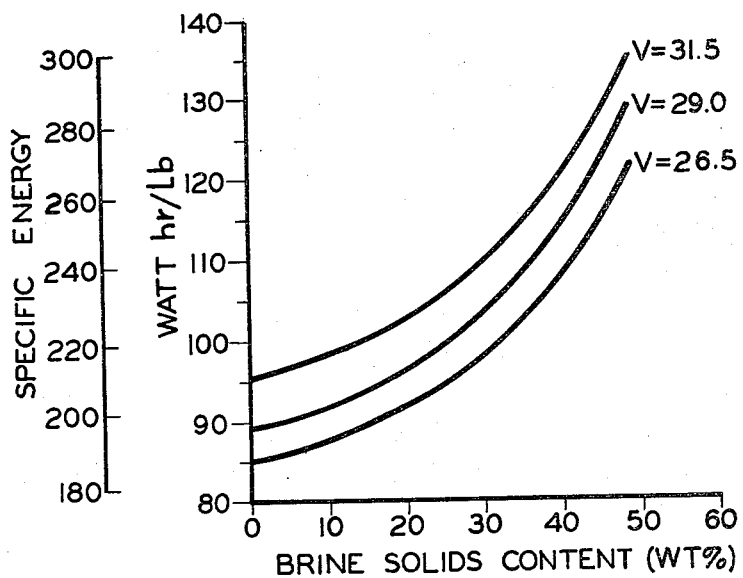
FIG.9

THERMOELECTRIC INTEGRATED MEMBRANE EVAPORATION SYSTEM

BACKGROUND OF THE INVENTION

1. Field of the Invention

The field of art to which this invention pertains is distillation apparatus and process including vapor treating devices.

2. Description of the Prior Art

The reclamation of water from human urine has presented aerospace engineering with a challenging task. The systems required on long duration space missions for water recovery of about 220 kg per man per month from crude generated waste water has resulted in many zero gravity system design attempts. Although some credible and efficient design systems have been developed, all have serious design and operational problems. Accordingly, an acceptable system is still being sought.

Raw urine contains approximately 4% by weight of urea and various salts in solution. As water is removed from the urine, solids rapidly concentrate and when, for example, 95% of the original water content of the urine is removed, the residual solids concentration of the remaining fluid is in the order of 30%. And while the requirement for a distillation product from precipitate-forming corrosive fluids is routinely encountered in the chemical industry in a gravity environment, the task of the aerospace engineer is complicated by the fact that a similar task must be accomplished in a zero gravity environment and with severe launch weight, volume and power consumption restrictions imposed.

Three of the more prominent waste recovery systems presently known are "The Air Evaporation Subsystem" (AES), "The Vapor Diffusion Reclamation System" (VDR), and "The Vapor Compression Distillation System" (VCD). In the AES system, electrical energy is used to provide the heat for evaporation of urine contained in a wick. Evaporated "pure" water is carried away by recirculated air, and subsequently condenses downstream of the wick on a conventional plate fin condenser cooled by a low temperature fluid. Wicks are periodically replaced when the solids content builds up and prevents sufficient wick feeding. In the VDR system, electrically heated urine is evaporated through a flat membrane sheet that is held in place by a pressurized diffusion gap between the membrane and condensed on a porous cold plate condenser, also using a low temperature cooling fluid. A recirculated urine-brine solution becomes concentrated as water is evaporated and is contained in a replaceable recirculation tank. While the system does have some advantages, it requires high energy input. The VCD system also uses a recirculation loop and a replaceable brine concentrate tank but employs a rotating drum to generate a gravity field that allows the evaporator and condenser surfaces to function. Steam evaporating over the inner drum surface is compressed and allowed to condense due to its elevated saturation temperature over the backside of the rotating evaporator drum. The elevated saturation temperature provides the potential required for conversion and transfer of the heat of condensation to the heat of evaporation. This is a regenerative system that requires approximately 25% of the energy requirements of the two previous systems. While AES is a relatively simple system which provides for good liquid separation, the problems of wick blockage, efficient wick feeding, and the heating requirements are significant disadvantages. While VDR has the advantages of good liquid separation and bacterial control, the necessity for a flat membrane and its heating requirements are significant problem areas. And while VCD does have the advantage of being a low power system, it has the disadvantages of being complex, noisy, and produces poor liquid separation, especially during shutdown periods.

Accordingly, what has been lacking in the art is a low-power, compact and gravity insensitive distillation system which has a relatively simple design and gives good component separation and bacterial control.

BRIEF SUMMARY OF THE INVENTION

Apparatus for producing microbiologically safe potable water from human urine, especially in a zero gravity environment, which is relatively light in weight, small in volume, and has low power requirement (e.g., less than $\frac{1}{3}$ that of the latent heat of evaporation of water) is described. The apparatus comprises a hollow fiber membrane evaporator, a thermoelectric heat pump to provide the heat for evaporation of the urine water, and a condensing surface to condense the water distilled from the urinal waste. The components are located relative to one another to keep heat transfer resistance to a minimum. In operation, the urinal waste is heated at the hot junction surface of the heat pump, evaporated through the hollow fiber membrane to separate the water from the waste solids, and the evaporated water condensed at the cold junction surface of the heat pump on a condensation surface.

Another aspect of the invention is the method of processing raw urine into potable water by passing it through the system described above.

Another aspect of the invention is the thermoelectric heat pump-condensation surface distillation-condensation apparatus of the present invention.

BRIEF DESCRIPTION OF THE DRAWINGS

FIGS. 8 and 9 show system sensitivity to power supply voltage variations and the recycle loop concentrations;

DETAILED DESCRIPTION OF THE PREFERRED EMBODIMENT

Figure 1:
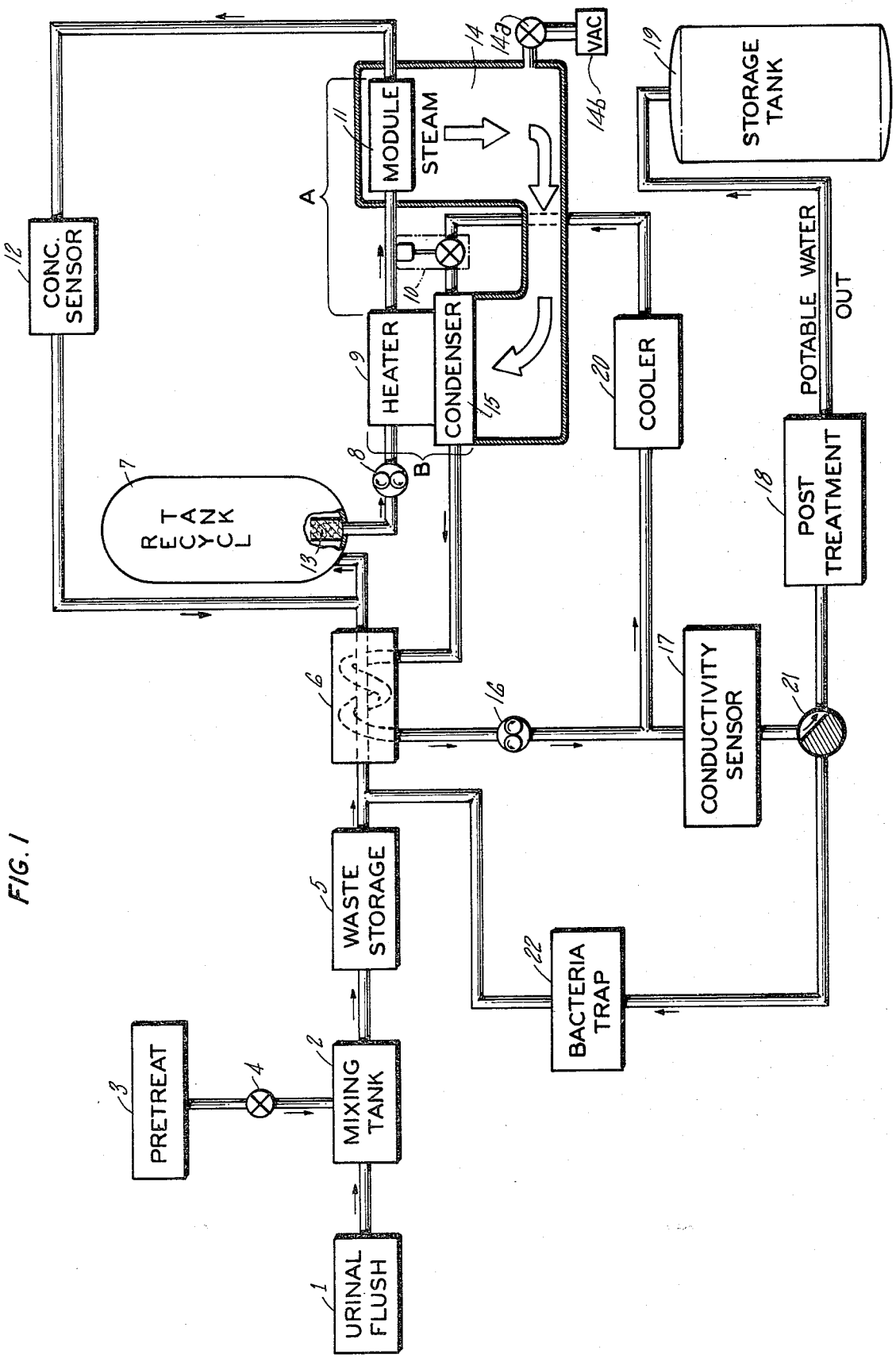
FIG. 1 is a simplified schematic of a distillation system of the present invention.

Preferably the thermoelectrically integrated membrane evaporation system of the present invention will be used in a vacuum distillation process operating at about 17.5 kPa absolute (2.5 psia) pressure level. It is also preferably used in conjunction with conventional feed, pretreatment and posttreatment apparatus, much of which is known in the art. Reference is made to FIG. 1 for a demonstration of a typical system according to the present invention.

Of course it is understood that while the system of the present invention is primarily for urine-water recovery, it can be used with any impurity-containing water where a potable end product is desired.

In FIG. 1 urinal flush indicated as 1, is conveyed to mixing tank 2, where a pretreating liquid 3, e.g., containing chromic acid, is metered to mixing tank 2 by pretreat metering valve 4. The mixed urinal flush and pretreating liquid is then conveyed to waste storage tank 5. From the storage tank the treated urinal flush is heated by preheaters 6 and conveyed to the recycle tank 7. From the recycle tank the flush is then pumped by recirculation pumps 8 to the hot junction surface 9 of the thermoelectric heat pump where the waste fluid is heated to a pasturization temperature of about 65° C. (150° F.) within a finned heat exchanger thermally contacting the hot junction surfaces of the thermoelectric elements. When the fluid is heated to evaporation temperature as detected by temperature sensor 10, the recirculated pretreated waste fluid is then passed through the hollow fiber membrane module 11 containing a plurality of hollow fiber membranes of about 0.05 cm (20 mils) inner diameter (preferably polysulfone tubes). The tube outsides are exposed to low pressure causing steam originating from the urinal fluid to evaporate at the tube outer walls, the heat of evaporation provided by the heated pretreated urinal flush flowing at a rate of about 175 kg per kg of product water through the tubes. A waste fluid recirculation rate is selected which limits the temperature decrease through the evaporator to a few degrees (Centigrade), typically 3° C. The limited temperature decrease provides for efficient evaporator and thermoelectric heat pump operation. The slightly cooled (approximately 3° C. or 5.4° F.) and concentrated urine is returned to the recycle tank 7 after passing through the module 11 passing by a concentration sensor 12 and filtered by an approximately thirty micron conventional fiber-wrapped precipitate filter 13. It is then pumped back to the hot junction surface 9 by recirculation pumps 8 where it is reheated and recycled. The evaporated steam 14 condenses on the condensation surface 15 thermally contacting the cold junction surface of the thermoelectric element 15. Valve 14a controls vacuum source 14b which may be either a conventional vacuum pump or space vacuum and can assist in evaporating steam 14 from the exterior of the hollow fiber membranes contained in module 11. Preferably, the temperature differential A detected between the end of the hot junction surface and the end of the module is approximately 3° C. and the temperature differential B between the hot junction surface and condensing surface is approximately 9° C. In the particular embodiment of FIG. 1, a 9° C. temperature differential between the cold junction surface and the hot junction surface of the thermoelectric elements were detected and this was found to produce operation of the system in a performance range that maintained a favorable heat pump coefficient of performance (COP). This is defined as the refrigeration effect divided by the electrical power input.

The pretreated and diluted urinal flush passed through the 9° C. temperature difference of the thermoelectric elements provides a 6.89 kPa (1 psia) saturation pressure difference across the membrane. Due to the urea and salt contents of the urine, this pressure differential increases at high concentrations. The steam condenses on the wet, cooled condensation surface 15, e.g., a porous plate which acts like a sponge and the condensate is withdrawn through the porous plate to a thermally conducting water passage between the porous plate and the thermoelectric element cold junction surface where it is collected for removal. The removed condensate is pumped by pump 16 through conductivity sensor 17 to a small charcoal and ion exchange bed 18 where it is filtered and eventually pumped to a potable water storage tank 19 for crew use.

Figure 2:
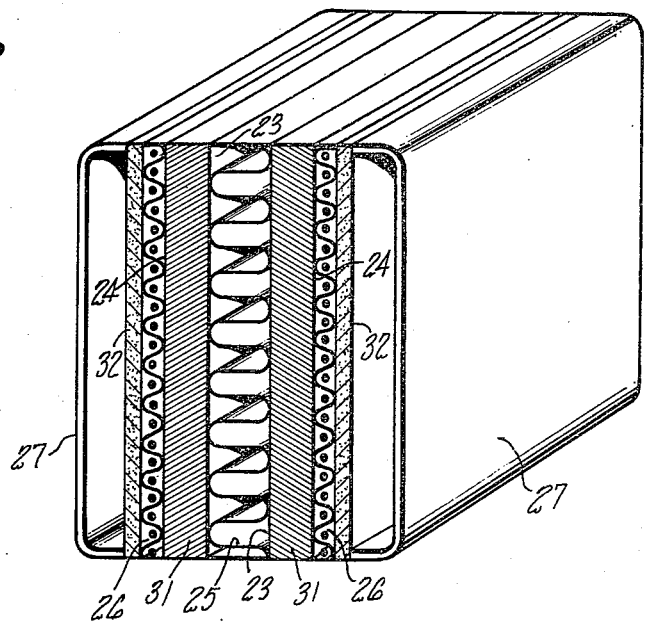
FIG. 2 is a typical design of the high efficiency thermoelectric heat pump-condensation surface distillation-condensation apparatus of the present invention.
Figure 3:
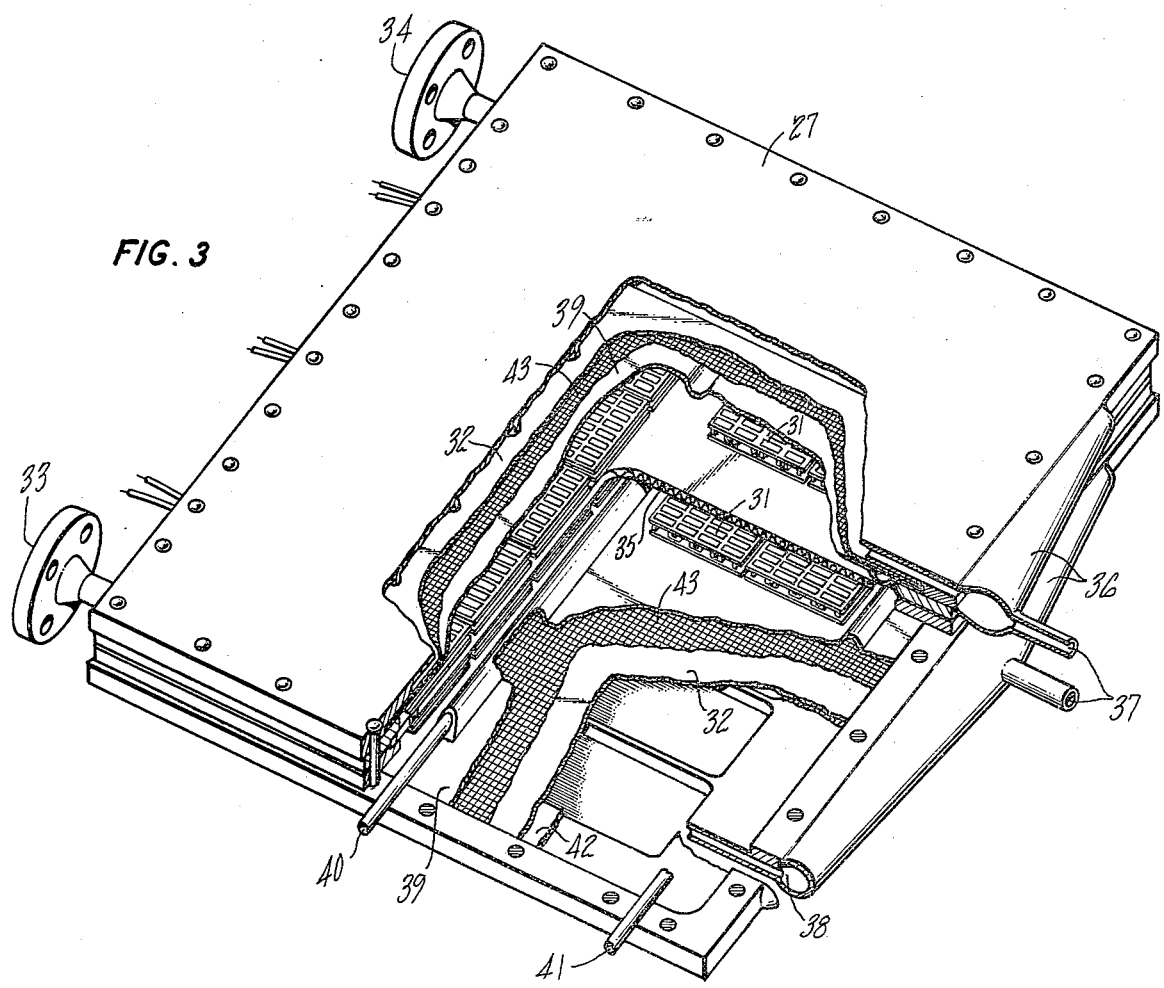
FIG. 3 is a cut-away view of the high efficiency thermoelectric heat pump-condensation surface distillation-condensation apparatus of the present invention.

FIG. 2 demonstrates the high efficiency thermoelectric regenerator of the present system better seen in the cutaway of FIG. 3. The apparatus of FIG. 2 represents a highly efficient apparatus designed to maximize heat use. In this design, 31 indicates the thermoelectric heat pump elements with 23 being the hot junction surfaces and 24 the cold junction surfaces. Heat conducting fins 25 bridge the hot junction surfaces of the thermoelectric elements maximizing heat transfer surface efficiency. The fins are so sized and located, between the hot junction surface pair in FIG. 2, to minimize temperature loss due to conduction. Porous or channeled condensation plates 32 are attached to the cold junction surfaces of the thermoelectric elements through screens 26 to allow bleed off of the condensed vapor at screens 26. The steam evaporated from the urine source enters the condensation plates through headers 27. This unit represents an efficient heat transfer design maximizing heat use with a minimal space requirement. Such design also allows a series of such units to be used based on the system size desired by simply attaching a series of such units side-by-side with steam header contact, further minimizing heat losses and maximizing heat use in the units. While the thermodynamic calculations herein are based on a two-unit system, additional units can be used to improve power efficiency and a three-unit system has been found to be particularly suitable.

In FIG. 3, the thermoelectric elements are indicated as 31 and condenser, here porous plates, as 32. The urinal flush enters through ports 33 and exits at port 34. The urine is heated at passages 35. The urinal steam enters steam headers 36 through ports 37 and is distributed through passages 38 and is passed over cold plates 39. The condensate is withdrawn through port 40. Cooling water enters through port 41 during high voltage periods of operation to limit the maximum temperature of urine waste water to about 65° C., and thus preventing urea breakdown to amonia. A high thermal conductance is maintained between the porous plate and the cold junction surface by means of a screen 43, or pin fin type or equivalent surface so as not to impede condensate and coolant flow. Character 42 indicates conventional elastomer fluid seals.

Figure 4:
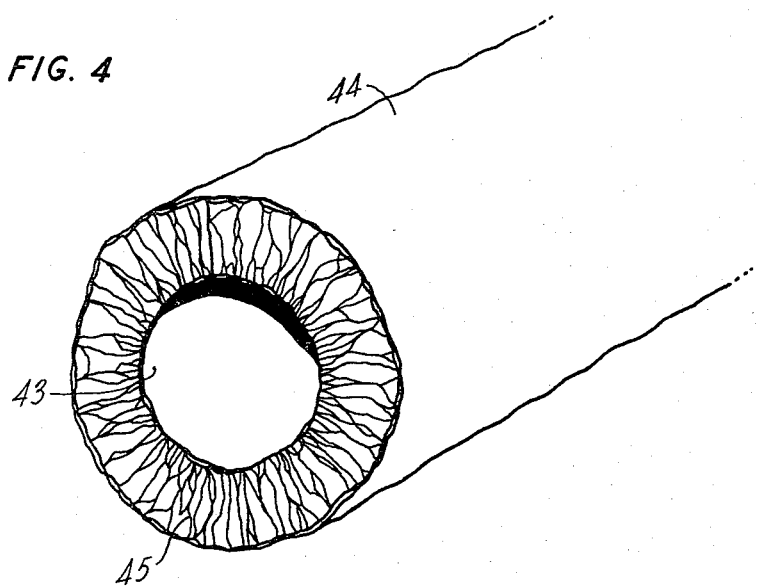
FIG. 4 is a sectional view of the hollow fiber membrane of the present invention.

The tubular hollow fiber membrane shown by FIG. 4 having internal surface 43 and external surface 44 bridged by fibular microstructure 45 allows the liquid feed to operate at atmospheric pressure by capillary action. Initially, a vacuum is pulled on the steam side, i.e., the outside of the fiber, to initiate fluid flow. Free and dissolved gases contained in the hot recirculating urine stream pass through the membrane and increase pressure in the steam passages. Although noncondensables in the steam passages will inhibit steam flow, testing of the system has shown the process to be tolerable of moderate amounts of noncondensables in the steam passages, such as oxygen and nitrogen, in the order of 10% by volume. Periodically, a vacuum purge is used to cleanse the system of noncondensables.

The thermoelectric section is preferably designed to operate on a 29±2.5 volt DC space vehicle power supply. If this is used in conjunction with a solar cell power system, the line voltage will vary from 26.5 volts for a high vehicle load condition to 31.5 volts during low load conditions. Although the thermoelectric device power draw will increase at the higher line voltages, no additional penalty is assumed for this low load case. Design power input for the heat pump is about 127 watts at 26.5 volts DC applied voltage with about 0.68 kg/hr (1.5 lb/hr) of dilute urine processed.

The thermoelectric elements are commercially designed to operate at relatively fixed electrical resistances, and power input and heat generated varies with the square of the voltage. For example, at 31.5 volts DC a resulting 40% increase in electrical heating relative to 26.5 volt DC operation would raise the temperature of the recirculating urine higher than 65° C. (150° F.). This would result in a urea breakdown and require extensive posttreatment to control ammonia production. This can be avoided by limiting temperature in the system to about 65° C. by means of a spoiler loop. The condensed steam water is recirculated through a cooler indicated as 20 in FIG. 1 where heat is absorbed and the cooled condensate returned back to the condenser when temperature exceeds 65° C. This additional cooling effect reduces the cold junction temperature of the thermoelectric elements and thus limits the amount of heat pumped to the hot junction of the thermoelectric element contacting the urine in the heating loop of the heat exchanger. A temperature control valve sensing urine loop temperature can be used to regulate the condensed product water recirculation flow by governing whether or not the condensed water is sent through the cooling loop or not. This is indicated in FIG. 1 as character 10. Although close tolerance voltage regulation would also prevent over-temperature, utilizing this control approach, the cost, weight, and power inefficiency of a close tolerance DC voltage regulator is avoided.

The product water delivered by the condensate pump 16 in FIG. 1 is passed through a conductivity sensor 17. If unacceptable product water conductivity is detected, based on impurity content, a three-way valve 21 that normally delivers the product water to the filtration module 18, will automatically activate and recycle the unacceptable water through a bacteria filter-trap 22, such as an acrylic polymer hollow fiber membrane, to the waste storage tank outlet at the end of tank 5. The filter-trap is used here to prevent bacteria in the waste recycle loop from contaminating the product water section. During normal operation, product water is delivered through the multi-filtration module 18 containing charcoal and ion exchange resins where the total organic carbon and ammonia impurities content is reduced to less than 25 parts per million.

The Table presents results of chemical analysis of four water samples run through the system of the present invention. Also included is the number of hours the membrane had been in operation with pretreated urine and the number of continuous hours of operation at 75° C. (167° F.). In viewing the results, it should be noted that urea breakdown to ammonia is known to increase rapidly at temperatures in the 75°–100° C. range (167°–212° F.). Solids concentration of the processed brine at the time of sample collection is also noted. These test samples were of collected condensate with no posttreatment or filtering of any kind.

While any hollow fiber membranes may be used in the system of the present invention which have the requisite properties of an ability to contain a liquid in a zero gravity environment with capability to withstand moderate pressure differentials, for example in excess of 1 atmosphere, polysulfone hollow fiber membranes SM-1 from Amicon having anisotropic structure and a 20 mil inner diameter were found particularly suitable.

TABLE

| Characteristic | Potable Water **Spec. SE-S-0073 | Sample 1 | Sample 2 | Sample 3 | Sample 4 |
| --- | --- | --- | --- | --- | --- |
| Total Hours on Membrane | | 7 | 120 | 40 | 210 |
| Continuous Hours | | 3 | 24 | 40 | 210 |
| % Solids | | 5 | 6.5 | 10 | 7 |
| Total Organic Carbon | 1.0 ppm | 6.0 ppm | 240 ppm* | 15.1 ppm | 12.0 ppm |
| Total Kjeldahl Ammonia | | 4.0 mg/l | 11.0 mg/l | 2.3 mg/l | 3.3 mg/l 2.5 ppm |
| Cadmium | 0.01 mg/l | | | None Detected | |
| Chromium (hexavalent) | 0.05 mg/l | | | None Detected | |
| Copper | 1.0 mg/l | | | 0.005 mg/l | |
| Iron | 0.3 mg/l | | | 0.035 mg/l | |
| Lead | 0.05 mg/l | | | 0.01 mg/l | |
| Manganese | 0.05 mg/l | | | None Detected | |
| Mercury | 0.005 mg/l | | | None Detected | |
| Nickel | 0.05 mg/l | | | 0.004 mg/l | |
| Selenium | 0.01 mg/l | | | None Detected | |
| Silver | 0.1 mg/l | | | None Detected | |
| Zinc | 5.0 mg/l | | | 0.107 mg/l | |

*The sample was contaminated with oil from the vacuum pump.
**NASA water purity specification.

Such fibers enable the module containing a plurality of these fibers, e.g., 1400 fibers, to operate at high permeabilities without the use of a pressurizing diluent gas as is required, for example, with flat sheet membranes. The hollow fiber membranes are compact, light, may be used in a vacuum distillation mode and automatically provide deaeration of the urine in the recirculation loop.

The pretreatment tank (character 3 of FIG. 1) of the system of the present invention contains a concentrated mixture of sulfuric and chromic acid which is added to the urinal flush to inhibit bacterial growth and to inhibit urea breakdown. The polysulfone hollow fiber membranes are compatible with this acid pretreated urine. Extremely high surface areas for evaporation are also obtained using the 0.05 cm (20 mil) inner diameter fibers. In the preferred module of the present invention containing such fibers, 1400 fiber elements, approximately 9.7 cm (3.8 inches) long containing 2787 cm$^2$ (432 in$^2$) of area for transport were strung longitudinally in a cartridge with the ends potted in end rings. The membrane bundle is mounted in a stainless steel brace member and inserted in a replaceable cartridge. The cartridge assembly also contains a screened liquid trap and a conductivity sensor which can detect contamination in the event of a urine breakthrough.

Figure 5:
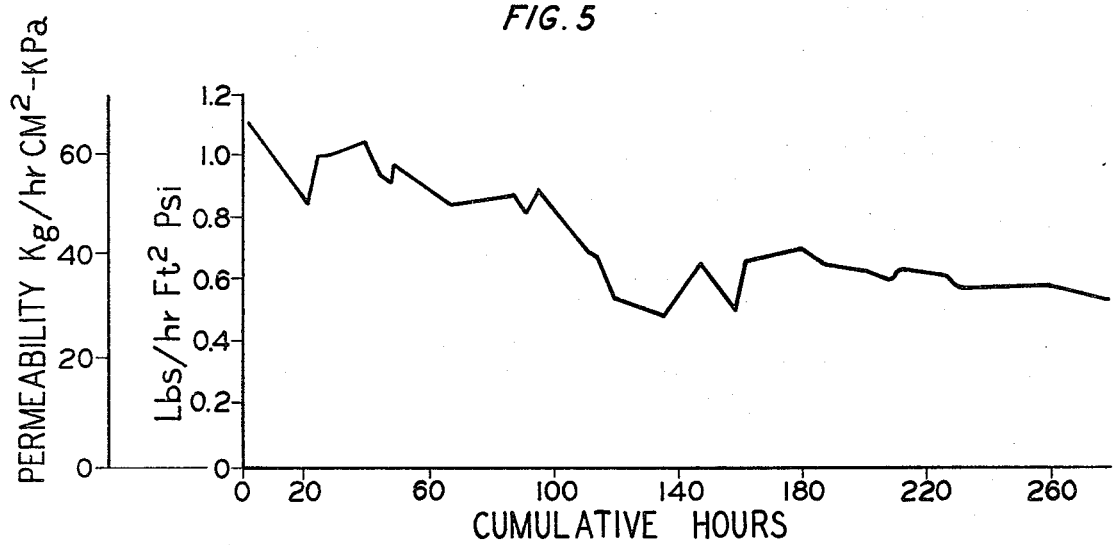
FIG. 5 is the hollow fiber membrane endurance data graphically represented.

Membrane performance has been characterized by a permeability factor P equal to the evaporated throughout divided by membrane inner area and by the saturation pressure differential across the membrane. FIG. 5 shows graphically a performance run of an Amicon SM-1 300 cm$^2$ (46.5 in$^2$) module evaporating a 4–30% concentrated urine solution. The element gradually wears into a P value of about 30 kg/hr-cm$^2$-kPa which is a preferred value for system sizing.

The actual evaporation occurs at the tube outer diameter and a concentration gradient occurs across the tube wall structure. Solids left at the evaporation interface diffuse back to the recirculation stream through the tube wall and concentrate in the recirculation circuit volume. During testing, back flushing removed the deposited solids and the measured permeability returned to the initial value approaching 61.23 kg/hr-cm$^2$-kPa (1.0 lb/hr-ft$^2$-psi). The repeated regenerations indicate that the solids do not permanently damage the membrane. Batching of the process, whereby loop solids are allowed to concentrate to an excess of 30%, followed by a fresh urine change, will produce a periodic dilute flush of the membrane fibers, limiting performance degradation and insuring many hours of useful operation per cartridge.

It is anticipated that periodic membrane replacements may be required in a long duration operating system, and module cartridges can be designed accordingly. Such cartridges are preferably designed with an operating life exceeding one month per cartridge.

The combination of the solid state thermoelectric elements and the porous plate condensors as demonstrated, for example, in FIG. 2, provide a particularly attractive subsystem for distillation systems wherever water purification is desired. The heat pump aspect of the subsystem provides an exceptionally energy efficient distillation subsystem which is also light in weight. The solid state thermoelectric element enables the urine water to be distilled at a power consumption of less than about ⅓ of the latent heat of evaporation of the water. In terms of vapor cycle or heat pump machinery performance this corresponds to a coefficient of performance (COP) of about three (COP=refrigeration effect/power input). Rather than using a vapor compression cycle, solid state thermoelectric devices are used in the system of the present invention to recover the heat of steam condensation at 57° C. (135° F.) and pump it to 65° C. (150° F.) to provide the heat for evaporation of the urine-based water at the hollow fiber outer surface.

The use of the thermoelectric devices in the system of the present invention provides an efficient, simple means of heat pumping because of the small temperature differentials required in the system. Although the device's efficiencies are not favorable in comparison to conventional refrigeration vapor cycle machinery where large hot-to-cold junction temperature differentials are required, they integrate quite satisfactorily with the hollow fiber membrane evaporator of the system of the present invention to produce a simple, compact, quiet, gravity insensitive, and efficient distillation process and apparatus.

The thermoelectric element is composed of thermocouples connected in series and grouped in small modules. A preferred module selected for the system of the present invention is a Cambion element manufactured by the Cambridge Thermionics Corporation of Cambridge, Mass. Each couple contains a P and an N material typically made of bismuth telluride. When voltages impress across the couple, a temperature differential occurs. As current flows through the series circuit, a heat flow is induced from the lower temperature side (cold junction) to the hot temperature side (hot junction) and thus produces a heat pump effect. Electrical and thermodynamic performances of the devices can readily be expressed in mathematical formula established by Seebeck, Peltier, and Thompson. The cold junction heat flow may be expressed as:

$$Q_C = a_m T_c I - (R_m I^2 / 2) - K_m \Delta T$$

where:
  $I = (V - a_m \Delta T)/R_m$
  $Q_C$ = cold junction heat flow, w
  $a_m$ = average Seebeck coefficient, v/deg K
  $T_c$ = cold junction temperature, deg K
  $I$ = current, amps
  $V$ = voltage
  $R_m$ = average electrical resistance, ohms
  $K_m$ = average thermal conductivity, w/deg K
  $\Delta T$ = temperature difference between the hot and cold junction surfaces of the thermoelectric element.

In the present application, it is most convenient to impose a DC voltage across a stack of thermoelectric elements and relate the heat transfer to generated temperature differentials. Rearranging the foregoing equations, the resultant form is:

$$Q_C = a_m T_c \left( \frac{V - a_m \Delta T}{R_m} \right) - \tfrac{1}{2} \left( \frac{V - a_m \Delta T}{R_m} \right)^2 R_m - K_m \Delta T$$

$$P_{in} = \frac{V^2}{R_m} \left( 1 - \frac{a_m \Delta T}{V} \right)$$

$$COP_R = \frac{a_m T_c}{V} - \tfrac{1}{2} \frac{R_m}{V} \left( \frac{V - a_m \Delta T}{R_m} \right) - \frac{K_m \Delta T}{V} \left( \frac{V - a_m \Delta T}{R_m} \right)^{-1}$$

Figure 6:
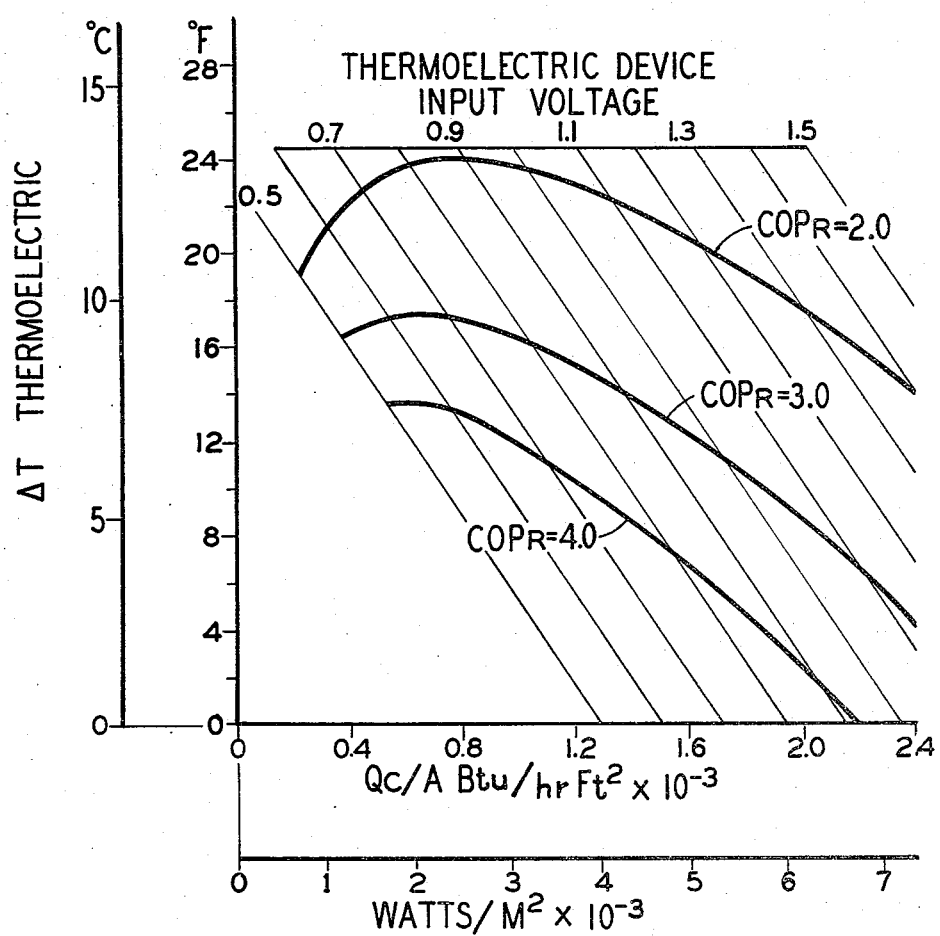
FIG. 6 is the thermoelectrically integrated membrane evaporation system performance data graphically shown.

Using Cambion Thermionics Corporation published data for 65° C. (149° F.) properties of $a_m$, $R_m$, and $K_m$, (The Cambion Thermoelectric Handbook, 2nd Edition, Cambridge Thermionics Corporation, Cambridge, Mass. 1972), a performance map for a thermoelectric heat pumping device according to the present system has been worked out as is demonstrated by FIG. 6.

Characteristics of the device give a heat pumping capacity which varies directly with imposed voltage and inversely with the imposed temperature differential. Competitive COP's occur at relatively low differentials and heat fluxes. Optimization of the distillation unit, therefore, requires the matching of the thermoelectric element characteristics for the available voltage with the integrated membrane characteristics and the fluid properties.

The condensation surface (15 in FIG. 1 and 32 in FIGS. 2 and 3) can be any heat conducting material, preferably a metal such as stainless steel. Also preferred is that the plate be in the form of a porous condensation plate which can be any permeable, heat conducting material, preferably a metal such as a sintered stainless steel plate, having a water permeability of at least 1 cc/hr-cm$^2$-kPa. Exemplary plates can be obtained from Martin Kurz & Co., Inc., Mineola, N.Y. In addition to the novel thermoelectric element-condensation plate subsystem, the coupling of this subsystem with the hollow fiber membrane evaporator produces a system of surprising power efficiency. The membrane area and number of thermoelectric elements are selected by balancing power requirements with component sizes. Based on the particular thermoelectric elements selected for the subsystem, in order to attain the desired COP greater than 3.0, the design temperature differential must be restricted to 10° C. (18° F.) and the element voltage held below 1.0 volt. Power efficiency increases at decreasing values of these parameters. Low system volume and weight requirements make selection of the design point in this range or lower desirable. A 10° C. temperature differential allows for heat transfer losses and also enables the evaporator to be operated at a 6.89 kPa (1 psia) saturation pressure differential which results in an acceptable membrane module size.

Figure 7:
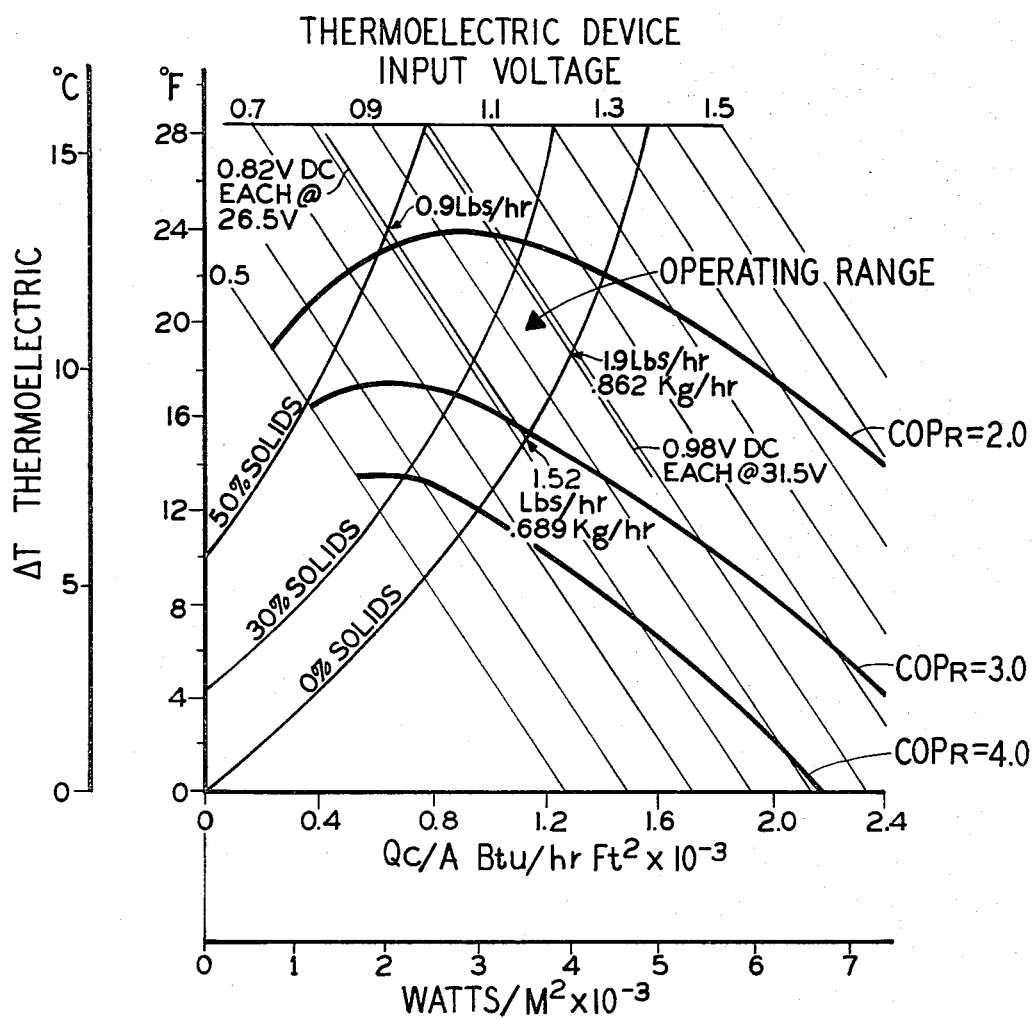
FIG. 7 displays graphically thermoelectric device performance data with the membrane evaporator characteristics superimposed.
Figure 10:
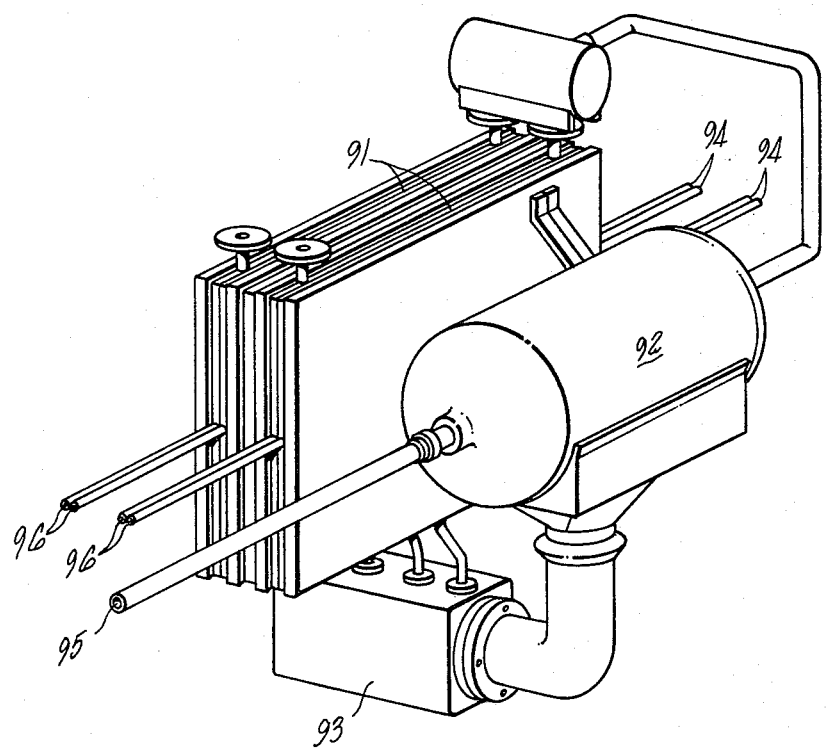
FIG. 10 shows a typical hardware arrangement for the system of the present invention.

FIG. 7 displays graphically a thermoelectric device performance with the membrane evaporator characteristics superimposed. About 2787 cm$^2$ (432 in$^2$) of membrane area and about 968 cm$^2$ (150 in$^2$) of thermoelectric element area are required for each approximately 3.31 kg (1.5 lb) per hour of water evaporated. Typical system sensitivity to power supply voltage variations and recycle loop concentrations is demonstrated by FIGS. 8 and 9.

As referred to above, urinal flush waste water to be fed to the recycle loop system is pretreated with chromic acid, at a rate of about 4 ml of pretreat per liter of waste water. Sulfuric acid and chromium trioxide is present in the pretreat solution as a concentrated solution, i.e., about 44% by weight H$_2$SO$_4$, 11% by weight CrO$_3$, the balance being water. The acid pretreat solution, in addition to assisting in the prevention of urea breakdown, assists in bacteria control. The system of the present invention contains a holding tank, for example indicated as 5 on FIG. 1, instrumented for high and low fluid levels. As water evaporates from the constant volume recycle loop, make-up pretreated urine is added from the holding tank. If the holding tank content is low, the system may be automatically shut down or be placed in a recycle mode with the condensate returned to the concentrated urine recycle loop via the acrylic polymer hollow fiber membrane, bacteria trap indicated as 22 on FIG. 1.

The recycle tank indicated as 7 in FIG. 1 will gradually increase in solids concentration, eventually having its contents in a mud-like state. It is preferably designed to be of such a size for replacement at two-week intervals based on a three-person load and urine concentration to 50% solids (representing a 98% water recovery).

Incorporation of a bellows design can also be used in the recycle tank for use, e.g., in a flight system, to eliminate the requirement for tank replacement. Thus, when the solids concentration in the urine recirculation loop reaches maximum concentration, the fluid can be discharged to a conventional vacuum dried waste commode system with the concentrated fluid being further processed in the same manner as crew solid waste. By bellows design is of course meant any design system which could be emptied as bellows by the simple application of pressure resulting in the shrinking and substantial elimination of the inner space of the bellows chamber in response to such pressure and the forcing out of the contents of such bellows in response to such shrinking space. Further, in response to the elimination of such pressure, the bellows-type chamber would return to its normal size having been emptied of its internal contents. The recycle tank contains a solids filter at its entrance to trap precipitates forming in the concentrated recycle loop. This is indicated as 13 in FIG. 1. It is located in the coolest section of the loop since that is where precipitation would first occur. A bellows tank design would require a separate filter cartridge that would have to be located at the recycle tank outlet line and would require periodic replacement.

The small, highly efficient evaporator and thermoelectric regenerator modules allow for a small process section package of only about 0.03 M$^3$ (1.0 ft$^3$). FIG. 9 is a pictorial package of an exemplary system according to the present invention. In this exemplary system, a two-subsystem pack of thermoelectric modules and porous condensation plates (FIG. 2) are used, indicated as 91 in FIG. 9. The membrane module is indicated as 92. Headers 93 insure relatively smooth flow. In operation, the pretreated urinal flush enters at conduits 94 and exits at conduits 95. The water condensate exits at conduits 96. Preferably, forty-eight thermoelectrical elements are included in each subsystem pack. Accordingly, in the exemplary system shown ninety-six units are present. The entire system design and location of component parts is made in such a way as to maximize all heat transfer. Accordingly, the urine loop heat exchanger is centrally located to minimize hot side heat loss and to minimize heat transfer temperature losses through the heat exchanger fins. Condenser steam passages are cooler and are located on the outer sides where they will be insulated to control temperature levels.

Handling of the concentrated urine has proved to be difficult due to the abrasive and corrosive nature of the concentrated urine brine. In fact, the concentrate is so hostile that it even inhibits bacterial growth. In view of this fact, periodic concentration of the liquid plus the 75° C. (150° F.) operating temperature provides excellent bacterial control. The possibility of bacterial buildup in the cooler condenser plate must also be considered. Accordingly, if desired, a sterilization mode can be built into the system whereby the thermoelectric module voltage polarity is periodically reversed causing the hot junction to occur at the condenser plate, thereby elevating the normally cooler condenser plate to sterilization temperature.

Pump selection in other urine reclamation systems has always proved difficult because of the corrosive nature of the urinal fluids. Peristalsis (undulated tube) pumps previously used are limited life items and therefore failure prone. While any pump with the requisite thermal and corrosive properties may be used, a well-proved positive displacement gear pump driven by a 28 volt DC permanent magnet motor is preferred. A magnetically coupled motor/pump drive provides complete leak-proof separation of the urine loop fluid from the driving motor. No dynamic sealing is required. Positive displacement is selected over centrifugal non-positive displacement type pumps because of the relative insensitivity to viscosity changes (resulting from the increasing solids concentration in the recirculating urine loop) of the positive displacement pumps.

While any material which has the requisite temperature and corrosion resistant properties for use in the system of the present invention may be used for the various storage chambers and conduits of the present system, 300 series stainless steel (AISI) and compatible brazing and welding materials are especially preferred because of their anticorrosive properties, especially toward chromic acid.

Another advantage of the system of the present invention is that the components of the system are selected and so placed in conjunction with one another to keep heat transfer resistance to a minimum and heat conductivity to a maximum in the system, further contributing to the improved efficiency of the system.

From a hardware standpoint, the thermoelectric integrated membrane evaporation system of the present invention presents an approach to urine-water reclamation that integrates proven components to produce a design exhibiting exceptional weight, power and volume properties not to mention gravity insensitivity. For example, a system suitable for flight on long duration space missions in addition to consistently producing potable water and being able to be maintained with safety and within acceptable crew time limitations will also have the advantages of being light in weight, for example, approximately 85 kg (187 lbs), have low power requirements, for example, 167 watts at 26.5 vdc, and be of small volume, for example, 0.5 $M^3$ (17.7 $ft^3$). The system produces microbiologically safe potable water by a sequential application of definite control procedures. At each component and interface, the change of entrance or growth of bacteria is checked. Procedures designed into the system including chemical pretreatment, pasteurization, distillation, vapor duct liquid entrapment, and final bacteria filtration ensure that at each component and component interface the chance of bacterial growth is eliminated or severely reduced. For example, reversing the polarity of the thermoelectric elements present an effective condenser sterilization mode. Accordingly, while the system provides important weight, power and volume advantages, its efficient production of quality potable water is paramount.

Although this invention has been shown and described with respect to a preferred embodiment, it will be understood by those skilled in this art that various changes in form and detail thereof may be made without departing from the spirit and scope of the claimed invention.

Having thus described a typical embodiment of my invention, that which I claim as new and desire to secure by Letters Patent of the United States is:

1. A urine-water recovery system comprising:
    at least one thermoelectric heat pump having heating and cooling junction surfaces;
    at least one hollow fiber membrane evaporation tube having an interior and exterior surface;
    and at least one condensation surface;
    the heat junction surface being in fluid flow communication with the interior of the evaporation tube, the condensation surface being in fluid flow communication with the exterior surface of the evaporation tube, and the condensation surface being in heat transfer communication with the cooling junction surface, the heat transfer surface area of the junction surfaces matched with the interior surface area of the evaporation tubes to produce potable water at a total system energy use of less than about $\frac{1}{3}$ of the latent heat of evaporation of the water, operation of the system being gravity insensitive and the heat transfer surface area of the junction surfaces matched with the interior surface area of the at least one evaporation tube to produce at least 0.5 kg/hr of potable water at a total system energy use of less than 400 w-hr/kg.

2. The apparatus of claim 1 wherein the heat pump comprises bismuth telluride semiconductors connected in series.

3. The apparatus of claim 1 wherein the evaporation tube comprises a polymeric polysulfone tube with a 20 mil inner diameter.

4. The apparatus of claim 1 wherein about 2800 $cm^2$ of membrane interior surface area is present for each about 970 $cm^2$ of heat transfer surface area of the junction surfaces of the heat pump.

5. The apparatus of claim 1 wherein the condensation surface is a sintered stainless steel plate with a permeability of at least 1 cc/hr-$cm^2$-kPa.

6. A process of recovering potable water from urinal waste comprising:
    heating the urinal waste to pasteurization temperature by contact with the hot junction surface of at least one thermoelectric heat pump;
    passing said heated waste through the interior of at least one hollow fiber membrane and evaporating steam from the exterior of said membrane by subjecting the exterior of the membranes to a vacuum;
    followed by condensing said steam by contact with a condensation surface in heat transfer communication with the cold junction surface of the thermoelectric heat pump; the surface area of the hot and cold junction surfaces of the heat pump matched with the interior surface area of the hollow fiber membrane to produce potable water at a total system energy use of less than about $\frac{1}{3}$ of the latent heat of evaporation of the water, operation of the system being gravity insensitive.

7. The process of claim 6 wherein the heat transfer surface area of the junction surfaces is matched with the interior surface area of the evaporation tubes to produce at least 0.5 kg/hr of potable water at a total energy use of less than 400 w-hr/kg.

* * * * *